United States Patent
Choi et al.

(10) Patent No.: US 11,321,564 B2
(45) Date of Patent: May 3, 2022

(54) METHOD AND APPARATUS FOR PROCESSING IMAGE, AND SERVICE ROBOT

(71) Applicant: Samsung Electronics Co., Ltd., Suwon-si (KR)

(72) Inventors: Byung-Kwon Choi, Seongnam-si (KR); Seungyong Hyung, Yongin-si (KR); Taesin Ha, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 143 days.

(21) Appl. No.: 16/672,875

(22) Filed: Nov. 4, 2019

(65) Prior Publication Data

US 2020/0242359 A1 Jul. 30, 2020

(30) Foreign Application Priority Data

Jan. 30, 2019 (KR) .................. 10-2019-0011954

(51) Int. Cl.
| | |
|---|---|
| G06K 9/00 | (2006.01) |
| G06T 3/40 | (2006.01) |
| G05D 1/02 | (2020.01) |
| B25J 11/00 | (2006.01) |

(52) U.S. Cl.
CPC ......... *G06K 9/00664* (2013.01); *B25J 11/008* (2013.01); *B25J 11/0085* (2013.01); *G05D 1/0246* (2013.01); *G06T 3/40* (2013.01)

(58) Field of Classification Search
CPC ... G06K 9/036; G06K 9/00664; B25J 19/023; B25J 11/0085; B25J 11/008; G06T 3/00; G06T 3/40; G05D 1/0246; G05D 2201/02
See application file for complete search history.

(56) References Cited

U.S. PATENT DOCUMENTS

| | | | |
|---|---|---|---|
| 9,830,534 | B1 | 11/2017 | Ravichandran et al. |
| 10,049,307 | B2 | 8/2018 | Pankanti et al. |
| 2018/0225646 | A1 | 8/2018 | Miyakoshi |
| 2018/0348783 | A1* | 12/2018 | Pitzer ................... G05D 1/0246 |
| 2019/0080608 | A1* | 3/2019 | Lee ..................... G08G 1/09623 |

FOREIGN PATENT DOCUMENTS

| | | |
|---|---|---|
| JP | 2003281503 A | 10/2003 |
| JP | 2014211694 A | 11/2014 |
| KR | 100918480 B1 | 9/2009 |
| KR | 20100105247 A | 9/2010 |
| KR | 20130051680 A | 5/2013 |
| KR | 101460964 B1 | 11/2014 |

* cited by examiner

*Primary Examiner* — Brenda C Bernardi
(74) *Attorney, Agent, or Firm* — Harness, Dickey & Pierce, P.L.C.

(57) ABSTRACT

An apparatus and method for processing an image are disclosed. The method includes preprocessing an image, recognizing an object in the preprocessed image, determining whether to use a recognition result of the object based on a quality of the recognition result, selecting, in response to a determination that the recognition result is not to be used, one of a first process for postprocessing the preprocessed image and a second process for predicting the object based on a set operation mode, and operating according to the selected process.

20 Claims, 7 Drawing Sheets

100

METHOD AND APPARATUS FOR PROCESSING IMAGE, AND SERVICE ROBOT

CROSS-REFERENCE TO RELATED APPLICATION

This application claims priority under 35 U.S.C. § 119 to Korean Patent Application No. 10-2019-0011954, filed on Jan. 30, 2019, in the Korean Intellectual Property Office, the entire contents of which are incorporated herein by reference in their entirety.

BACKGROUND

1. Field

At least one example embodiment relates to image processing.

2. Description of the Related Art

Recently, with technological development of intelligent robots, service robots that provide services to users are gradually diversified. For example, the service robots are becoming more diverse, such as a guide robot, a cleaning robot, a housework helper robot, an educational service robot, and a pet robot. However, example embodiments are not limited thereto. These service robots interact with users and may perform intelligent tasks. The service robots operates according to a programmed (or alternatively, a preprogrammed) algorithm and performs defined functions in various situations.

SUMMARY

Some example embodiments relate to a method of processing an image.

In some example embodiments, the method includes preprocessing the image to generate a preprocessed image; recognizing an object in the preprocessed image to generate a recognition result; determining whether to use the recognition result based on a quality of the recognition result; selecting a selected process from among a first process and a second process based on a set operation mode, in response to determining not to use the recognition result, the first process being a process of postprocessing the preprocessed image and the second process being a process of predicting the object; and operating according to the selected process.

In some example embodiments, when the selected process is the first process, the operating according to the first process includes postprocessing the preprocessed image by cropping a recognition area of the object in the preprocessed image to generate a cropped image; preprocessing the cropped image to generate a preprocessed cropped image; and recognizing the object in the preprocessed cropped image.

In some example embodiments, the preprocessing the cropped image includes adjusting a size of the cropped image.

In some example embodiments, the operating further includes selecting the cropped image from among the image received from a camera and the cropped image.

In some example embodiments, when the selected process is the second process, the operating according to the second process includes predicting the object based on a previous recognition result.

In some example embodiments, the selecting includes selecting the first process when a recognition rate of the set operation mode is less than a maximum recognition rate, and selecting the second process when the recognition rate of the set operation mode corresponds to the maximum recognition rate.

In some example embodiments, the determining of whether to use the recognition result includes determining a size of a recognition area of the object; and determining not to use the recognition result in response to the size of the recognition area being less than a set size.

Some example embodiments relate to an apparatus configured to process an image.

In some example embodiments, the apparatus includes a memory configured to store at least one instruction; and a processor configured to execute the instruction to, preprocess the image to generate a preprocessed image, recognize an object in the preprocessed image to generate a recognition result, determine whether to use the recognition result of the object based on a quality of the recognition result, select a selected process from among a first process and a second process based on a set operation mode, in response to determining not to use the recognition result, the first process being a process of postprocessing the preprocessed image and the second process being a process of predicting the object, and operate according to the selected process.

In some example embodiments, when the first process is selected, the processor is configured to operate according to the first process by, postprocessing the preprocessed image by cropping a recognition area of the object in the preprocessed image to generate a cropped image, preprocessing the cropped image to generate a preprocessed cropped image, and recognizing the object in the preprocessed cropped image.

In some example embodiments, the processor is configured to preprocess the cropped image by adjusting a size of the cropped image.

In some example embodiments, the processor is configured to select the cropped image from the image received from a camera and the cropped image.

In some example embodiments, when the second process is selected, the processor is configured to operate according to the second process by, predicting the object based on a previous recognition result.

In some example embodiments, the processor is configured to, select the first process when a required recognition rate of the set operation mode is less than a maximum recognition rate, and select the second process when the required recognition rate corresponds to the maximum recognition rate.

In some example embodiments, the processor is configured to determine whether to use the recognition result by, determining a size of a recognition area of the object, and determining not to use the recognition result in response to the size of the recognition area being less than a set size.

Some example embodiments relate to a service robot.

In some example embodiments, the service robot include a robot controller configured to determine an operation mode of the service robot; and an image processor configured to, preprocess an image to generate a preprocessed image, recognize an object in the preprocessed image to generate a recognition result, determine whether to use the recognition result of the object based on a quality of the recognition result, select a selected process from among a first process and a second process based on the operation mode, in response to a determination that the recognition result is not to be used, the first process being a process of postprocessing the preprocessed image and the second process being a process of predicting the object, operate according to the selected process to generate a result, and transmit the result to the robot controller.

In some example embodiments, when the first process is selected, the image processor is configured to operate according to the first process by, postprocessing the preprocessed image by cropping a recognition area of the object in the preprocessed image to generate a cropped image, preprocessing the cropped image to generate a preprocessed cropped image, and recognizing the object in the preprocessed cropped image.

In some example embodiments, the image processor is configured to preprocess the cropped image by adjusting a size of the cropped image.

In some example embodiments, the image processor is configured to operate according to the second process by predicting the object based on a previous recognition result.

In some example embodiments, the image processor is configured to, select the first process when a required recognition rate of the operation mode is less than a maximum recognition rate, and select the second process when the required recognition rate corresponds to the maximum recognition rate.

In some example embodiments, the image processor is configured to determine whether to use the recognition result by, determining a size of a recognition area of the object, and determining not to use the recognition result in response to the size of the recognition area being less than a set size.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
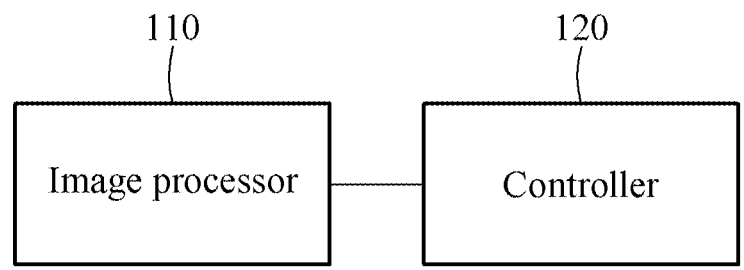
FIG. 1 illustrates a service providing apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates a service providing apparatus according to at least one example embodiment.

Referring to FIG. 1, a service providing apparatus 100 includes an image processor 110 and a controller 120.

The service providing apparatus 100 may be an apparatus for providing services of the service providing apparatus 100 to a user. The service providing apparatus 100 may include but is not limited to a service robot, for example.

The controller 120 sets or determines an operation mode of the service providing apparatus 100. The set operation mode may be, for example, a power save mode, a detection mode, or a normal mode. The power save mode may be a mode for saving power of the service providing apparatus 100. The detection mode may be a mode for precisely searching a vicinity of the service providing apparatus 100 to accurately recognize an object. The normal mode may be a mode set as a default.

A required recognition rate may be set for each operation mode. The required recognition rate may be minimum frames per second (fps) required for the image processor 110 to recognize the object. For example, a required recognition rate of the normal mode may be 20 fps, a required recognition rate of the detection mode may be 30 fps, and a required recognition rate of the power save mode may be 10 fps.

The controller 120 may control or adjust a recognition rate of the image processor 110. For example, the controller 120 may change the operation mode to control the recognition rate of the image processor 110. The controller 120 may change the operation mode from the power save mode to the normal mode such that the image processor 110 performs the object recognition at a high recognition rate. Also, the controller 120 may change the operation mode from the detection mode to the normal mode such that the image processor 110 performs the object recognition at a low recognition rate.

The image processor 110 may perform the object recognition and transfer a result of the object recognition to the controller 120. In this example, a quality of the recognition result may be low. In other words, a recognition rate may be low. When the controller 120 receives the recognition result from the image processor 110, the controller 120 may experience difficulty in providing an appropriate service. Therefore, in one or more example embodiments, when the quality of the recognition result is low, the image processor 110 may operate to improve the quality of the recognition result instead of transferring the recognition result to the controller 120. In other words, the image processor 110 operates to improve an object recognition performance. Hereinafter, the image processor 110 will be further described in detail with reference to FIGS. 2 through 4.

Figure 2:
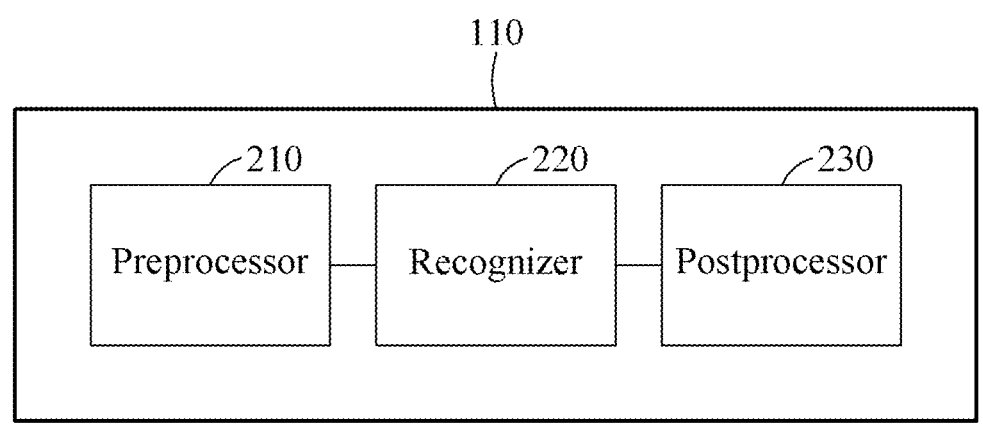
FIGS. 2 through 4 illustrate an image processor according to at least one example embodiment.
Figure 3:
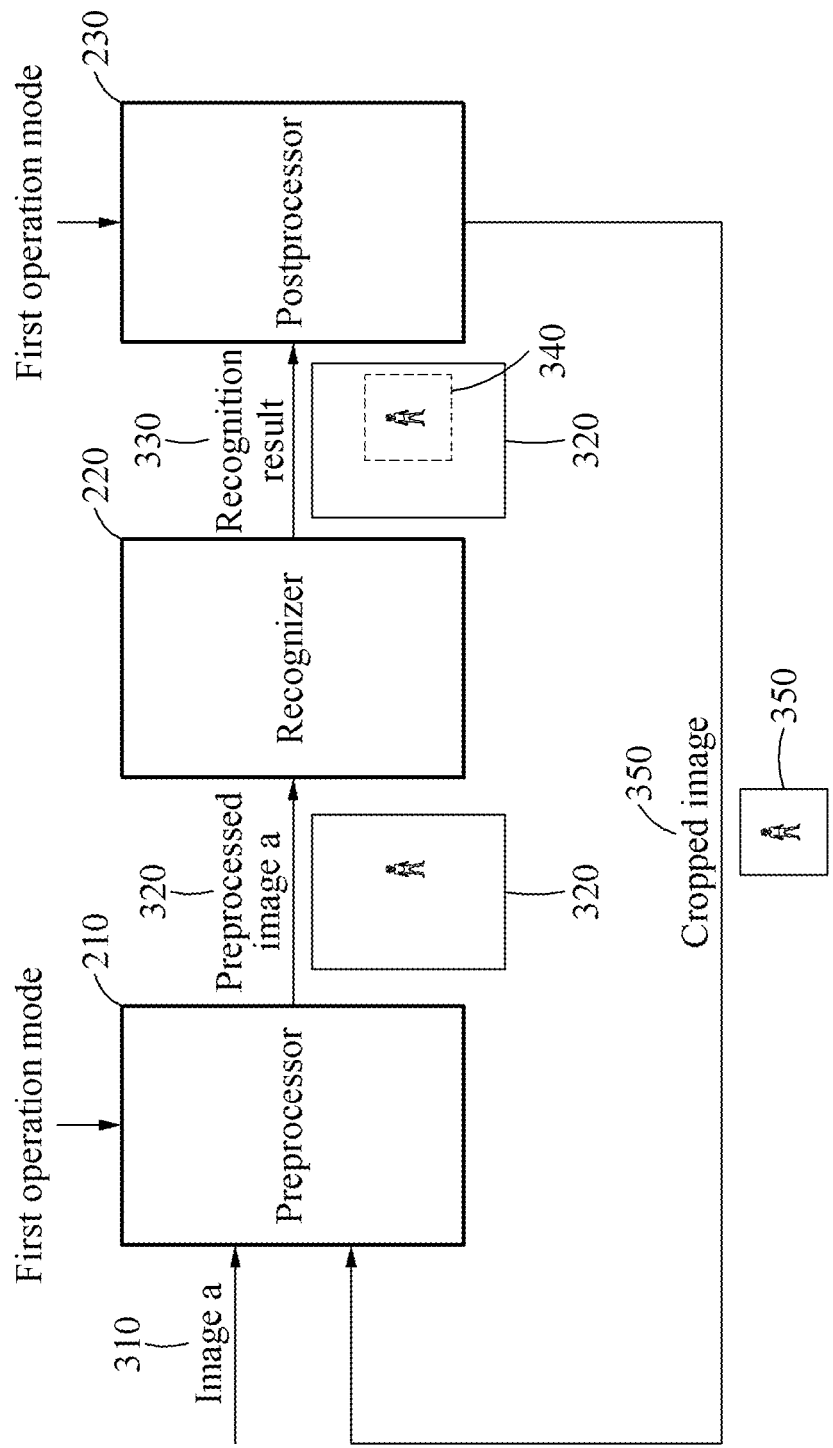
Figure 4:
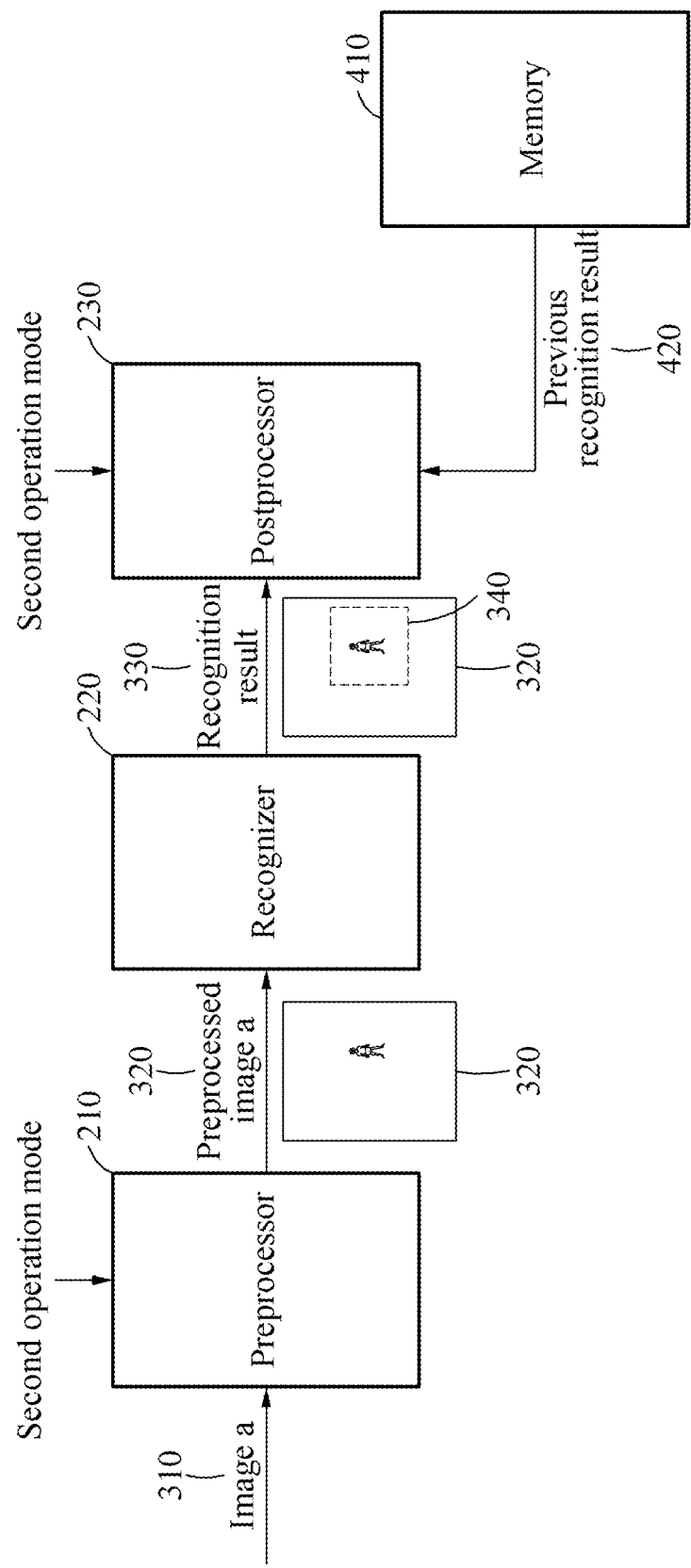

FIGS. 2 through 4 illustrate an image processor according to at least one example embodiment.

Referring to FIG. 2, the image processor 110 may include a preprocessor 210, a recognizer 220, and a postprocessor 230. For example, as discussed in more detail below, the preprocessor 210, the recognizer 220, and the postprocessor 230 may be implemented by processing circuitry through the execution of instructions that transform the processing circuitry into a special purpose computer to preprocess an image, recognize an object in the preprocessed image, determine whether to use a recognition result of the object based on a quality of the recognition result, and select, based on a set operating mode, one of a first process for postprocessing the preprocessed image and a second process for predicting the object, in response to determining not to use the recognition result.

The preprocessor 210 receives at least one image from a camera.

The preprocessor 210 preprocesses the received image. For example, the preprocessor 210 may remove noise of the received image. Also, the preprocessor 210 may adjust a size of the received image to be reduced. In other words, the preprocessor 210 may perform downscaling on the received image.

The recognizer 220 recognizes an object in the preprocessed image.

The postprocessor 230 may estimate a quality of a recognition result of the object and determine whether to use the recognition result based on the estimated quality. The quality of the recognition may include, for example, a size of a recognition area of the object. For example, the postprocessor 230 may determine whether the size of a recognition area of the object is less than a desired (or, alternatively, a predetermined) size. When the size of a recognition area of the object is less than the desired (or, alternatively, the predetermined) size, the postprocessor 230 may determine not to use the recognition result of the object.

When it is determined that the recognition result of the object is not to be used, the postprocessor 230 selects one of a first process for postprocessing the preprocessed image and a second process for predicting the object based on a set operation mode. When a required recognition rate of the set operation mode is lower than a maximum recognition rate, for example, 30 fps of the image processor 110, the postprocessor 230 may select the first process which is also referred to as, a first operation. When the required recognition rate of the set operation mode is approximate or equal to the maximum recognition rate of the image processor 110, the postprocessor 230 may select the second process which is also referred to as, a second operation.

A case in which the image processor 110 selects the first process will be described with reference to FIG. 3. A case in which the image processor 110 selects the second process will be described with reference to FIG. 4.

Referring to FIG. 3, in an example of FIG. 3, the preprocessor 210 and the postprocessor 230 may receive setting information indicating that a current operation mode is set to a first operation mode from the controller 120. Here, the first operation mode may be the normal mode or the power save mode described above.

The preprocessor 210 receives an image a 310 from a camera and preprocess the image a 310.

The recognizer 220 recognizes an object in a preprocessed image a 320.

The postprocessor 230 may determine whether to use a recognition result 330 of the object based on a quality of the recognition result 330. For example, the postprocessor 230 may compare a size of a recognition area 340 of the object to a desired (or, alternatively, a predetermined) size. When the size of the recognition area 340 is less than the desired (or, alternatively, the predetermined) size, the postprocessor 230 may determine not to use the recognition result 330 of the object.

When it is determined that the recognition result 330 is not to be used, the postprocessor 230 may generate a cropped image 350 by cropping the preprocessed image a 320. For example, a currently set operation mode may be a normal mode. A required recognition rate, for example, 20 fps of the normal mode may be lower than a maximum recognition rate, for example, 30 fps. In this example, the preprocessor 210 and the recognizer 220 may use less resources than maximum available resources. In other words, the preprocessor 210 and the recognizer 220 may have spare resources to process the cropped image 350. Since the currently set operation mode is the normal mode having the required recognition rate lower than the maximum recognition rate, the postprocessor 230 may determine that the preprocessor 210 and the recognizer 220 are capable of processing the cropped image 350. Based on such determination, the postprocessor 230 may generate the cropped image 350 by cropping the recognition area 340 from the preprocessed image a 320. Depending on an implementation, the postprocessor 230 may perform cropping a larger area than the recognition area 340.

The postprocessor 230 may feedback the cropped image 350 to the preprocessor 210, and the preprocessor 210 may preprocess the cropped image 350. For example, the preprocessor 210 may remove noise of the cropped image 350 and/or adjust a size of the cropped image 350.

The preprocessor 210 may receive images subsequent to the image a from the camera. For example, the preprocessor 210 may receive subsequent images such as an image a-1, an image a-2, an image a-3 and the like. The preprocessor 210 may receive the cropped image 350 from the postprocessor 230. In this example, the preprocessor 210 may preprocess the cropped image 350 instead of the images following the image a. In other words, the preprocessor 210 may receive images subsequent to the image a from the camera as well as receive the cropped image 350 from the postprocessor 230, select the cropped image 350 from the subsequent images of the image a and the cropped image 350, and preprocess the cropped image 350. For example, when the preprocessor 210 receives the image a-3 from the camera and receives the cropped image 350 from the postprocessor 230, the preprocessor 210 may select the cropped image 350 from the image a-3 and the cropped image 350 and preprocess the cropped image 350. As such, the preprocessor 210 may preprocess the cropped image 350 instead of the image a-3 in an order to preprocess the image a-3.

The recognizer 220 may recognize the object from the preprocessed cropped image. When a quality of a recognition result of the object in the preprocessed cropped image is relatively high, the postprocessor 230 may transfer the recognition result of the object of the preprocessed cropped image to the controller 120. When the quality of the recognition result of the object in the preprocessed cropped image is relatively low, the image processor 110 may perform the aforementioned operations of FIG. 3 again.

Referring to FIG. 4, in an example of FIG. 4, the preprocessor 210 and the postprocessor 230 may receive setting information indicating that a current operation mode is set to a second operation mode from the controller 120. Here, the second operation mode may be the detection mode described above.

The recognizer 220 may recognize an object from the preprocessed image a 320. When it is determined that the recognition result 330 of the object is not to be used, the postprocessor 230 may fetch a previous recognition result 420 from a memory 410. Here, the previous recognition result 420 may be a recognition result of at least one previous image of the image a. For example, since the current operation mode is the detection mode, a required recognition rate of the detection mode may be approximate to a maximum recognition rate or correspond to the maximum recognition rate. In this example, the preprocessor 210 and the recognizer 220 may have few or no spare resources to process the cropped image 350. The postprocessor 230 may fetch the previous recognition result 420 from the memory 410 instead of generating the cropped image 350. Also, the postprocessor 230 may perform prediction of the object in the preprocessed image a 320 based on the previous recognition result 420. The postprocessor 230 may transfer a result of the prediction to the controller 120.

Figure 5:
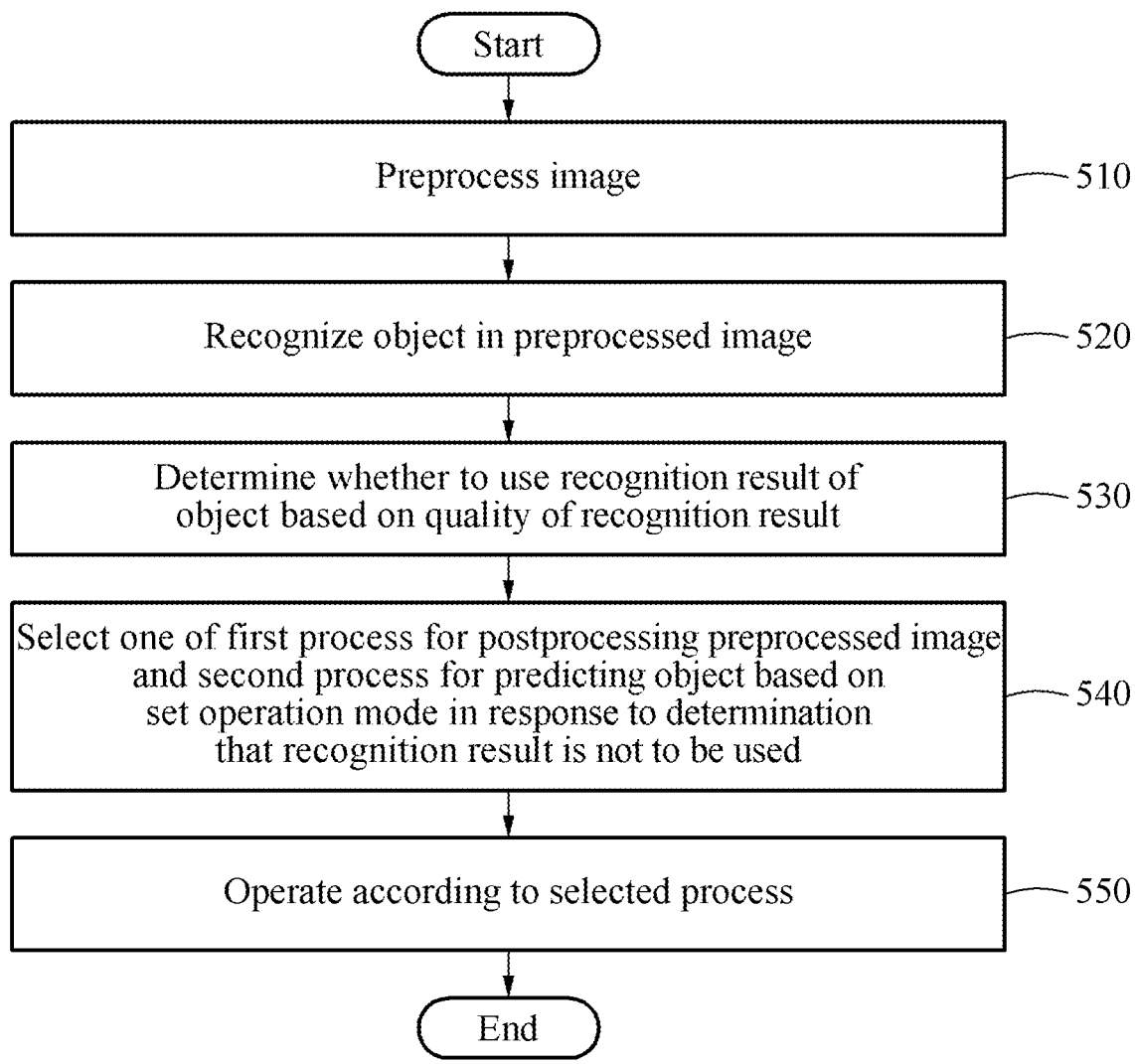
FIG. 5 is a flowchart illustrating an image processing method according to at least one example embodiment.

FIG. 5 is a flowchart illustrating an image processing method according to at least one example embodiment.

Referring to FIG. 5, the image processing method of FIG. 5 may be performed by the image processor 110. The image processor 110 may also be referred to as an image processing apparatus.

In operation 510, the image processor 110 preprocesses an image.

In operation 520, the image processor 110 recognizes an object in the preprocessed image.

In operation 530, the image processor 110 determines whether to use a recognition result of the object based on a quality of the recognition result. The image processor 110 determines whether a size of a recognition area of the object is less than a desired (or, alternatively, a predetermined) size. When the size of the recognition area is less than the desired (or, alternatively, the predetermined) size, the image processor 110 determines not to use the recognition result of the object.

When it is determined that that the recognition result is not to be used, in operation 540, the image processor 110 selects one of a first process for postprocessing the preprocessed image and a second process for predicting the object based on a set operation mode. When a required recognition rate of the set operation mode is less than a maximum recognition rate, the image processor 110 selects the first process. When the required recognition rate corresponds to the maximum recognition rate, the image processor 110 selects the second process. In other words, the image processor 110 may select the first process when a currently set operation mode corresponds to an operation mode, for example, a normal mode or a power save mode having a lower recognition rate than a maximum recognition rate, and may select the second process when the currently set operation mode corresponds to an operation mode, for example, a detection mode having the maximum recognition rate.

In operation 550, the image processor 110 operates according to the selected process. When the first process is selected, the image processor 110 may generate a cropped image by cropping a recognition area of the object in the preprocessed image, preprocess the cropped image, and recognize the object in the preprocessed cropped image. When the second process is selected, the image processor 110 may predict the object based on a previous recognition result.

The description made with reference to FIGS. 1 through 4 is also applicable to operations of FIG. 5 and thus, repeated description will be omitted.

Figure 6:
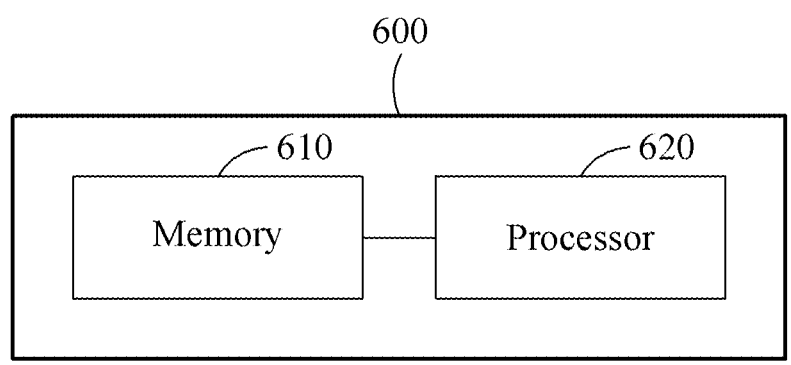
FIG. 6 is a block diagram illustrating an image processor according to at least one example embodiment.

FIG. 6 is a block diagram illustrating an image processor according to at least one example embodiment.

Referring to FIG. 6, an image processing apparatus 600 includes a memory 610 and a processor 620. The image processing apparatus 600 may correspond to the image processor 110.

The memory 610 may be connected to the processor 620, and include instructions executable by the processor 620, data to be calculated by the processor 620, or data processed by the processor 620. The memory 610 may include a non-transitory computer-readable medium, for example, a high-speed random access memory (RAM) and/or a non-volatile computer-readable storage medium (for example, one or more disk storage devices, a flash memory device, or other nonvolatile solid state memory devices).

The processor 620 may perform overall control of the image processing apparatus 600. The preprocessor 210, the recognizer 220, and the postprocessor 230 may be implemented by the processor 620.

The processor 620 may execute instructions stored in the memory 610 to performing one or more operations described with reference to FIGS. 1 through 5. The processor 620 preprocesses an image, recognizes an object in the preprocessed image, and determines whether to use a recognition result of the object based on a quality of the recognition result. When it is determined that that the recognition result is not to be used, the processor 620 may select one of a first process for postprocessing the preprocessed image and a second process for predicting the object based on a set operation mode and operates according to the selected process.

The description made with reference to FIGS. 1 through 5 is also applicable to operations of FIG. 6 and thus, repeated description will be omitted.

Figure 7:
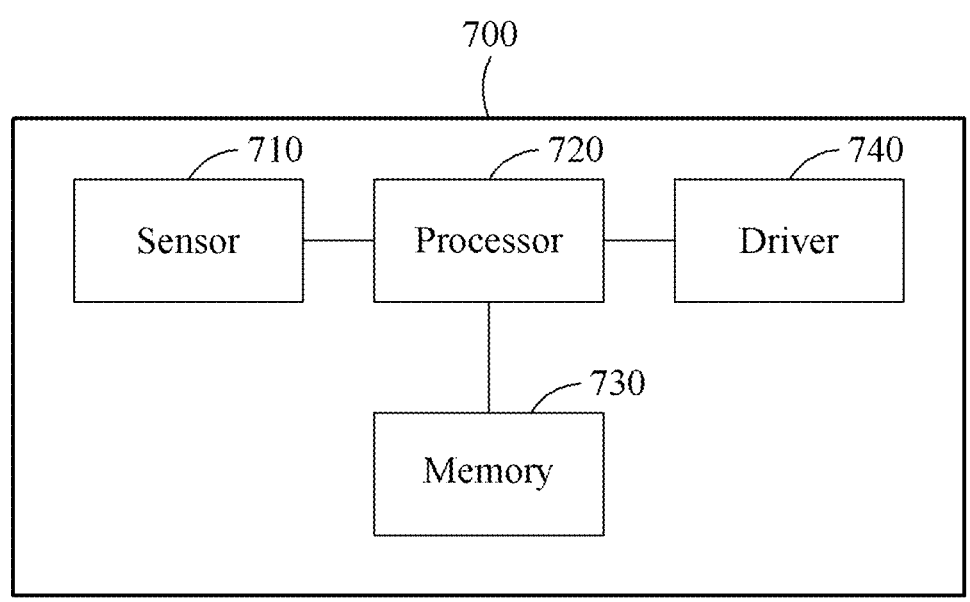
FIG. 7 is a block diagram illustrating a service robot according to at least one example embodiment.

FIG. 7 is a block diagram illustrating a service robot according to at least one example embodiment.

Referring to FIG. 7, the service robot 700 is a robot that provides services to a user. The service robot 700 may move within a service area and provide a service to the user for the purpose of use. The service robot 700 may provide, for example, a route guidance service, a companion service, a direction guidance service, a facility information service, a danger alarming service, an advertisement service, a cleaning service, a security service, a delivery service, and a cart service. In the facility information service, the service robot

700 may follow the user and provide information on a facility based on a location. In the route guidance service, the service robot 700 may guide the user to a destination. In the cart service, the service robot 700 may guide the user to a location of required goods while carrying a load.

Referring to FIG. 7, the service robot 700 includes a sensor 710, a processor 720, a memory 730, and a driver 740.

In some example embodiments, the service providing apparatus 100 of FIG. 1 may correspond to the service robot 700 such that, for example, the processor 720 may perform operations of the image processor 110 and the controller 120 and the memory 730 may correspond to the member 610.

Although FIG. 7 illustrates that the service robot 700 includes a single sensor 710 and a single processor 720, example embodiments are not limited thereto. The service robot 700 may include a plurality of sensors and a plurality of processors.

The sensor 710 acquires environment information of the service robot 700. For example, the sensor 710 may acquire information on an environment around the service robot 700 during driving.

The sensor 710 may include one or more cameras. The sensor 710 may include any one or combination of a distance sensor, a detection sensor, a depth sensor, a global positioning system (GPS) sensor, a microphone, a light detection and ranging (LiDAR) sensor, a motor encoder sensor, an infrared sensor, an inertial measurement unit (IMU) sensor, and a driving sensor.

The processor 720 may perform the operations of the image processor 110 and the controller 120. For example, when an operation mode of the service robot 700 is changed from a power save mode to a normal mode, the processor 720 may perform object recognition by adjusting or changing a recognition rate to be increased and provide a service based on a recognition result.

Depending on an implementation, the service robot 700 may include a plurality of processors. Here, one of the plurality of processors may perform the operation of the image processor 110 and another of the plurality of processors may perform the operation of the controller 120.

The memory 730 may include instructions executable by the processor 720, data to be calculated by the processor 720, or data processed by the processor 720.

The driver 740 may include at least one mechanical component for moving the service robot 700. For example, the driver 740 may include at least one motor. The motor may output a torque under a control of the processor 720, so that the service robot 700 moves based on the torque.

The description made with reference to FIGS. 1 through 6 is also applicable to operations of FIG. 7 and thus, repeated description will be omitted.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing an image using an apparatus including a processor and memory, the method comprising:
preprocessing, by the processor, the image to generate a preprocessed image;

recognizing, by the processor, an object in the preprocessed image to generate a recognition result;
determining, by the processor, whether to use the recognition result based on a quality of the recognition result;
selecting, by the processor, a selected process from among a first process and a second process based on a set operation mode, in response to determining not to use the recognition result, the first process being a process of postprocessing the preprocessed image and the second process being a process of predicting the object;
performing, by the processor, the selected process from among the first process of postprocessing the preprocessed image and the second process of predicting the object to generate a refined recognition result having an increased quality compared to the quality of the recognition result; and
instructing, by the processor, a robot controller to control a service robot based on the refined recognition result having the increased quality.

2. The method of claim 1, wherein, when the selected process is the first process, the performing the first process comprises:
postprocessing the preprocessed image by cropping a recognition area of the object in the preprocessed image to generate a cropped image;
preprocessing the cropped image to generate a preprocessed cropped image; and
recognizing the object in the preprocessed cropped image as the refined recognition result with the increased quality.

3. The method of claim 2, wherein the preprocessing the cropped image comprises:
adjusting a size of the cropped image.

4. The method of claim 2, wherein the performing further comprises:
selecting the cropped image from among the image received from a camera and the cropped image.

5. The method of claim 1, wherein, when the selected process is the second process, the performing the second process comprises:
predicting the object based on a previous recognition result to generate the refined recognition result with the increased quality.

6. The method of claim 1, wherein the selecting comprises:
selecting the first process when a recognition rate of the set operation mode is less than a maximum recognition rate, and
selecting the second process when the recognition rate of the set operation mode corresponds to the maximum recognition rate.

7. The method of claim 1, wherein the determining of whether to use the recognition result comprises:
determining a size of a recognition area of the object; and
determining not to use the recognition result in response to the size of the recognition area being less than a set size.

8. An apparatus configured to process an image, the apparatus comprising:
a memory configured to store at least one instruction; and
a processor configured to execute the instruction to,
preprocess the image to generate a preprocessed image,
recognize an object in the preprocessed image to generate a recognition result,
determine whether to use the recognition result of the object based on a quality of the recognition result,
select a selected process from among a first process and a second process based on a set operation mode, in response to determining not to use the recognition result, the first process being a process of postprocessing the preprocessed image and the second process being a process of predicting the object,
performing the selected process from among the first process of postprocessing the preprocessed image and the second process of predicting the object to generate a refined recognition result having an increased quality compared to the quality of the recognition result, and
control a service robot based on the refined recognition result having the increased quality.

9. The apparatus of claim 8, wherein when the first process is selected, the processor is configured to perform the first process by,
postprocessing the preprocessed image by cropping a recognition area of the object in the preprocessed image to generate a cropped image,
preprocessing the cropped image to generate a preprocessed cropped image, and
recognizing the object in the preprocessed cropped image as the refined recognition result with the increased quality.

10. The apparatus of claim 9, wherein the processor is configured to preprocess the cropped image by adjusting a size of the cropped image.

11. The apparatus of claim 9, wherein the processor is configured to select the cropped image from the image received from a camera and the cropped image.

12. The apparatus of claim 8, wherein when the second process is selected, the processor is configured to perform the second process by,
predicting the object based on a previous recognition result as the refined recognition result with the increased quality.

13. The apparatus of claim 8, wherein the processor is configured to,
select the first process when a required recognition rate of the set operation mode is less than a maximum recognition rate, and
select the second process when the required recognition rate corresponds to the maximum recognition rate.

14. The apparatus of claim 8, wherein the processor is configured to determine whether to use the recognition result by,
determining a size of a recognition area of the object, and
determining not to use the recognition result in response to the size of the recognition area being less than a set size.

15. A service robot comprising:
an image processor including a memory configured to store at least one instruction, and a processor configured to execute the at least one instruction to,
preprocess an image to generate a preprocessed image,
recognize an object in the preprocessed image to generate a recognition result,
determine whether to use the recognition result of the object based on a quality of the recognition result,
select a selected process from among a first process and a second process based on the operation mode, in response to a determination that the recognition result is not to be used, the first process being a process of postprocessing the preprocessed image and the second process being a process of predicting the object, perform the selected process from among the first process of postprocessing the preprocessed image and the second process of predicting the object to generate a refined recognition result having an increased quality compared to the quality of the recognition result, and transmit the refined recognition result having the increased quality to a robot controller, wherein the robot controller is configured to control the service robot based on the refined recognition result having the increased quality.

16. The service robot of claim 15, wherein when the first process is selected, the image processor is configured to perform the first process by, postprocessing the preprocessed image by cropping a recognition area of the object in the preprocessed image to generate a cropped image, preprocessing the cropped image to generate a preprocessed cropped image, and recognizing the object in the preprocessed cropped image as the refined recognition result with the increased quality.

17. The service robot of claim 16, wherein the image processor is configured to preprocess the cropped image by adjusting a size of the cropped image.

18. The service robot of claim 15, wherein the image processor is configured to perform the second process by predicting the object based on a previous recognition result to generate the refined recognition result with the increased quality.

19. The service robot of claim 15, wherein the image processor is configured to, select the first process when a required recognition rate of the operation mode is less than a maximum recognition rate, and select the second process when the required recognition rate corresponds to the maximum recognition rate.

20. The service robot of claim 15, wherein the image processor is configured to determine whether to use the recognition result by, determining a size of a recognition area of the object, and determining not to use the recognition result in response to the size of the recognition area being less than a set size.

\* \* \* \* \*